(12) United States Patent
McRae (10) Patent No.: US 9,900,660 B2
(45) Date of Patent: Feb. 20, 2018

(54) PASSWORD PROTECTED STREAM RECEIVERS

(71) Applicant: Vizio Inc., Irvine, CA (US)

(72) Inventor: Matthew Blake McRae, Irvine, CA (US)

(73) Assignee: Vizio Inc, Irvine, CA (US)

( * ) Notice: Subject to any disclaimer, the term of this patent is extended or adjusted under 35 U.S.C. 154(b) by 0 days.

(21) Appl. No.: 14/493,753

(22) Filed: Sep. 23, 2014

(65) Prior Publication Data

US 2016/0088328 A1    Mar. 24, 2016

(51) Int. Cl.
*H04N 21/475* (2011.01)
*H04N 21/436* (2011.01)

(52) U.S. Cl.
CPC ... *H04N 21/4753* (2013.01); *H04N 21/43615* (2013.01)

(58) Field of Classification Search
CPC ......... H04N 21/4223; H04N 21/41407; H04N 21/4126; H04N 21/43637; H04N 21/64707; H04N 21/43615; H04N 21/4753; H04N 21/25816
See application file for complete search history.

(56) References Cited

U.S. PATENT DOCUMENTS

| | | | |
|---|---|---|---|
| 6,223,292 B1 * | 4/2001 | Dean et al. | 726/28 |
| 8,170,532 B2 | 5/2012 | Wan et al. | |
| 2005/0071058 A1 | 3/2005 | Salande, Jr. | |
| 2007/0136778 A1 * | 6/2007 | Birger et al. | 725/117 |
| 2012/0079080 A1 * | 3/2012 | Pishevar | 709/220 |
| 2012/0239916 A1 * | 9/2012 | Malasani | H04L 41/0806 713/1 |
| 2013/0084905 A1 * | 4/2013 | Ehara | H04W 4/005 455/500 |
| 2013/0125225 A1 * | 5/2013 | Candelore | G06F 21/445 726/7 |
| 2013/0238702 A1 * | 9/2013 | Sheth et al. | 709/204 |
| 2013/0268758 A1 * | 10/2013 | Schrecker | G06F 21/00 713/168 |

(Continued)

*Primary Examiner* — Benjamin R Bruckart
*Assistant Examiner* — Aklil Tesfaye
(74) *Attorney, Agent, or Firm* — Law Office of Scott C Harris, Inc.

(57) ABSTRACT

A content stream caster can transfer playing of a content stream from the content stream caster to any of a plurality of stream receivers. The content stream caster wirelessly initiates contact with one of a plurality of stream receivers after which the content stream caster must authenticate with the receiver before the receiver permits the receiving of a URL identifying the location of the content source. A content stream caster, communicates with a stream receiver, an authentication software application residing on both devices and wired or wireless connections between the devices and between the devices and the stream source. The content stream caster may present the content stream or send the content source URL to the receiving device. The content stream caster authenticates with the receiver then sends the source content URL to the receiver. The receiver then streams the content from a URL or designated local streams through Tunneled Direct Link Setup (TDLS), Miracast, or other sources and presents the streamed content to the user.

8 Claims, 7 Drawing Sheets

(56) References Cited

U.S. PATENT DOCUMENTS

| | | | |
|---|---|---|---|
| 2013/0304860 A1* | 11/2013 | Yang | H04L 67/34 709/217 |
| 2014/0362293 A1* | 12/2014 | Bakar | H04N 5/4401 348/552 |
| 2014/0373123 A1* | 12/2014 | Kang | H04L 41/22 726/7 |
| 2015/0289005 A1* | 10/2015 | Holmquist | H04N 21/42684 725/25 |

* cited by examiner

PASSWORD PROTECTED STREAM RECEIVERS

BACKGROUND

Currently, when streaming UPnP or Google Cast (or Apple TV) a client can see and stream to all receivers. While this may be acceptable in a secure home environment with only authorized users, it might not be ideal in a business environment or an environment that may have guest users (where the technologies are increasingly being used).

As an example, an office might set up multiple stream receiving TVs (or separate boxes) in an office building including locations such as conference rooms, executive offices, etc. The current technology could enable screen hijacking or mistakes by transmitting parties. For example, an employee who attempts to stream a PowerPoint presentation to a screen in the local conference room might accidentally stream the presentation to the CEOs office; or a presentation to be viewed by the CEO may mistakenly be streamed to a public conference room.

SUMMARY

The inventor recognized that it would be helpful to have a way for a stream receiver to force the caster to enter identifying information such as a password before the stream receiver accepts a stream. This could prevent unauthorized persons from sending a stream to a stream receiver which may have an inappropriate audience.

Embodiments are disclosed that allow stream receivers to be optionally configured with a password so that sensitive content is not accidentally streamed to the wrong stream receiver.

An embodiment forces a user to provide an access password or a password that identifies the stream caster and an embodiment that allows a stream of a high priority to cause the termination of a lower priority stream.

BRIEF DESCRIPTION OF THE DRAWINGS in the drawings.

DETAILED DESCRIPTION

In a preferred embodiment, a stream receiver is disclosed which has an assigned password and a protocol for requesting that password from a stream caster. In this embodiment, the stream receiver does not broadcast its name. In an embodiment, the stream caster gains knowledge of the stream receiver's name through a callable function 104 depicted in FIG. 2. Once the stream caster contacts the stream receiver, it requests the stream receiver's password from the user. The user will provide the stream receiver's access password and the stream caster sends the password to the stream receiver. The stream receiver validates the password sent by the stream caster and if the password was correct, the stream receiver notifies the stream caster that the stream can be started. If the password was incorrect, the stream receiver notifies the stream caster that the password was incorrect.

The transport protocol between the stream caster and the stream receiver is normally Wifi (802.11 a/b/g/n). Two additional protocols are also available which are part of the 802.11 standard. The first is 802.11z and referred to as Tunneled Direct Link Setup (TDLS) and the second is a peer-to-peer wireless screen casting standard formed via Wi-Fi Direct and referred to as Miracast. Other wireless protocols can also be used.

The present invention is intended to be compatible to both TDLS and Miracast and other protocols such as Bluetooth and proprietary communications protocols.

DETAILED DESCRIPTION OF THE EMBODIMENTS

Figure 7:
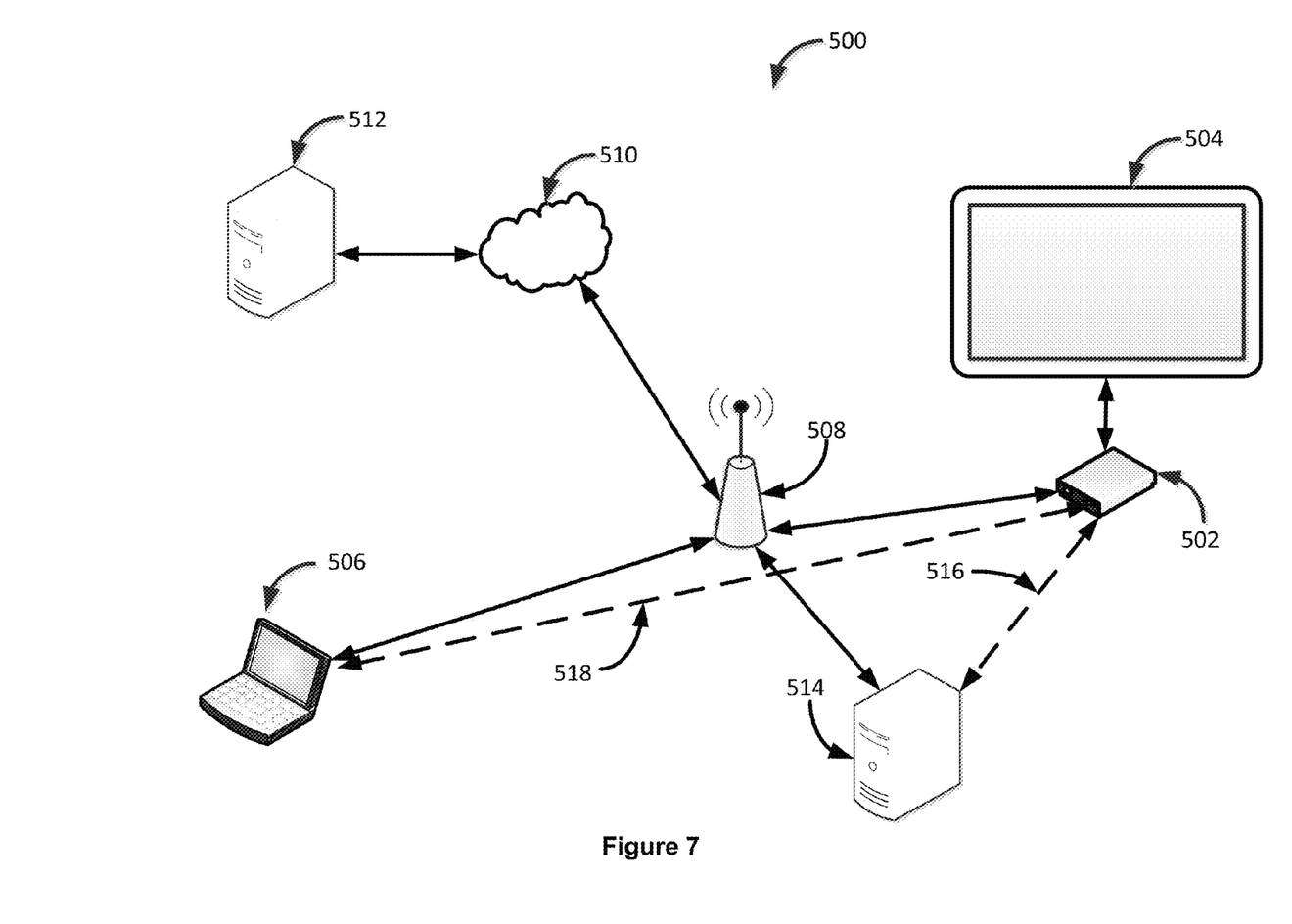
FIG. 7 is a depiction of the invention operating in a networked environment where streams may originate on a internet connected source content server or on a locally connected source content server through a Wifi router or via Tunneled Direct Link Setup (TDLS) or a Miracast connection.

Now referencing FIG. 7 where a system utilizing the invention is depicted. In this depiction, 500 depicts a stream receiver 502, a display screen 504, stream caster 506, a local content server 514, a Wifi Router 508, the internet cloud 510, and a cloud resident content server 512. In this depiction, stream caster 506 may select content residing on its own internal storage or local content server 514 or cloud based content server 512 and cast a URL that points to the content that will be streamed to stream receiver 502 via Wifi Router 508. In this scenario, stream receiver will connect, via the URL and Wifi Router 508 to the specified stream content server which in this depiction is the stream caster, local content server 514, or cloud resident server 512.

In another scenario, stream caster 506 and stream receiver 502 perform a password exchange as described in the detailed description of the invention below.

In another scenario, stream caster 506 may cast a stream from its own internal storage to stream receiver 502 wirelessly via TDLS and bypass wireless router 508. In this scenario, stream receiver 502 will receive content stream data directly from stream caster 506 via communications link 518. In another scenario, stream caster 506 may cast a content stream residing on local content server 514 with a URL directly to stream receiver via wireless router 508 to stream receiver 502 where stream receiver 502 will connect with local content server via TDLS after which stream receiver 502 will receive the specified content stream from local content server 514 over TDLS communication link 516 and bypassing wireless router 508. In the described scenarios where TDLS is employed, local content server 514 and stream caster 506 may transfer content streams to stream receiver 502 via Miracast instead of TDLS.

Figure 1:
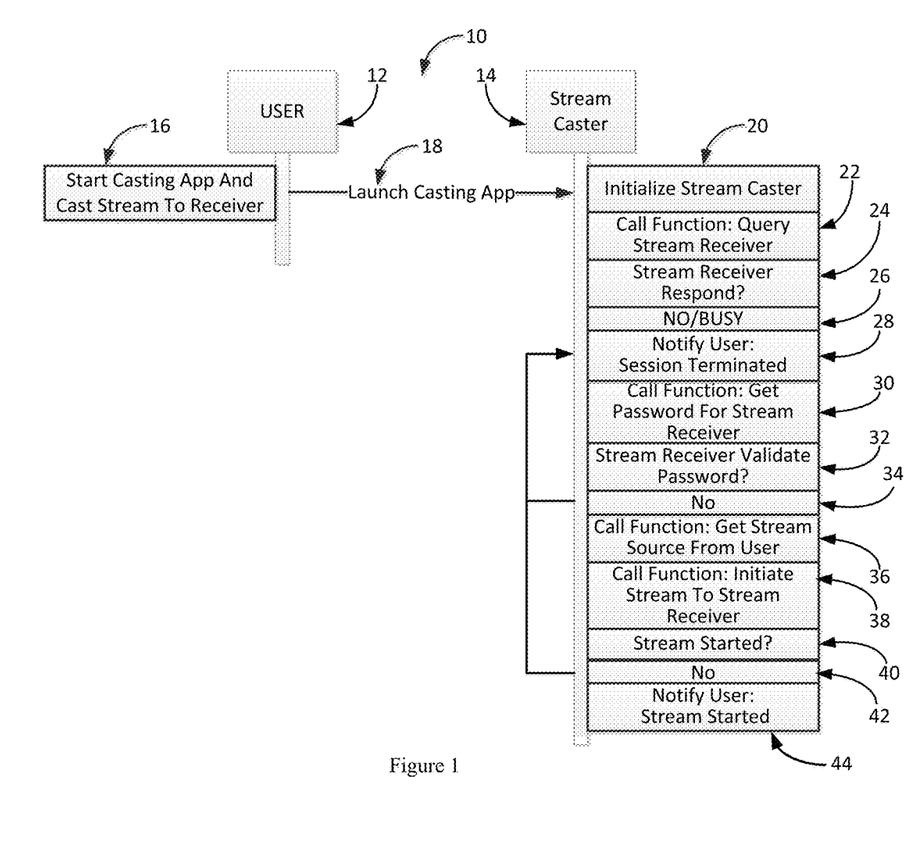
FIG. 1 is a depiction of a logic flow diagram for the first embodiment of the invention where the user is queried for a password to the targeted stream receiver.

Now referencing FIG. 1 where 10 depicts the logic flow of one embodiment of the invention. In this depiction user 12 and stream caster 14, which can be the same as 506 in FIG. 7, are depicted. This depiction starts with user 12 at processing block 16 "start casting app". This processing block sends signal 18 "launch casting app" to stream caster 506 to processing block 20 to "initialize stream caster". This processing block will initialize the stream caster application after which control will fall through to call function processing block 22 to "call function; query stream receiver". The Function to Query Stream Receiver is shown as 104 in FIG. 2, where 100 depicts a callable function: query stream receiver 104. Execution of the function starts with display processing block 106 "display receiver list to user". Since the stream receivers in this invention do not broadcast their network names over the wireless network, the user has no way of identifying which stream receivers are residing on the network. Display processing block 106 displays a list of stream receivers, typified by the table 400 depicted in FIG. 6. Table 400 contains the names and addresses of eight stream receivers for the user to choose from. After the table has been displayed, control will fall through to ask user processing block 108 to "ask user to select a stream receiver". This processing block will start a dialog with the user after the list of stream receiver list is displayed to the user. This processing block will send signal 110 "to select stream receiver" to user 12 at processing block 112 where the "user selects stream receiver from list". The user thus selects one stream receiver from the displayed list of stream receivers.

Figure 2:
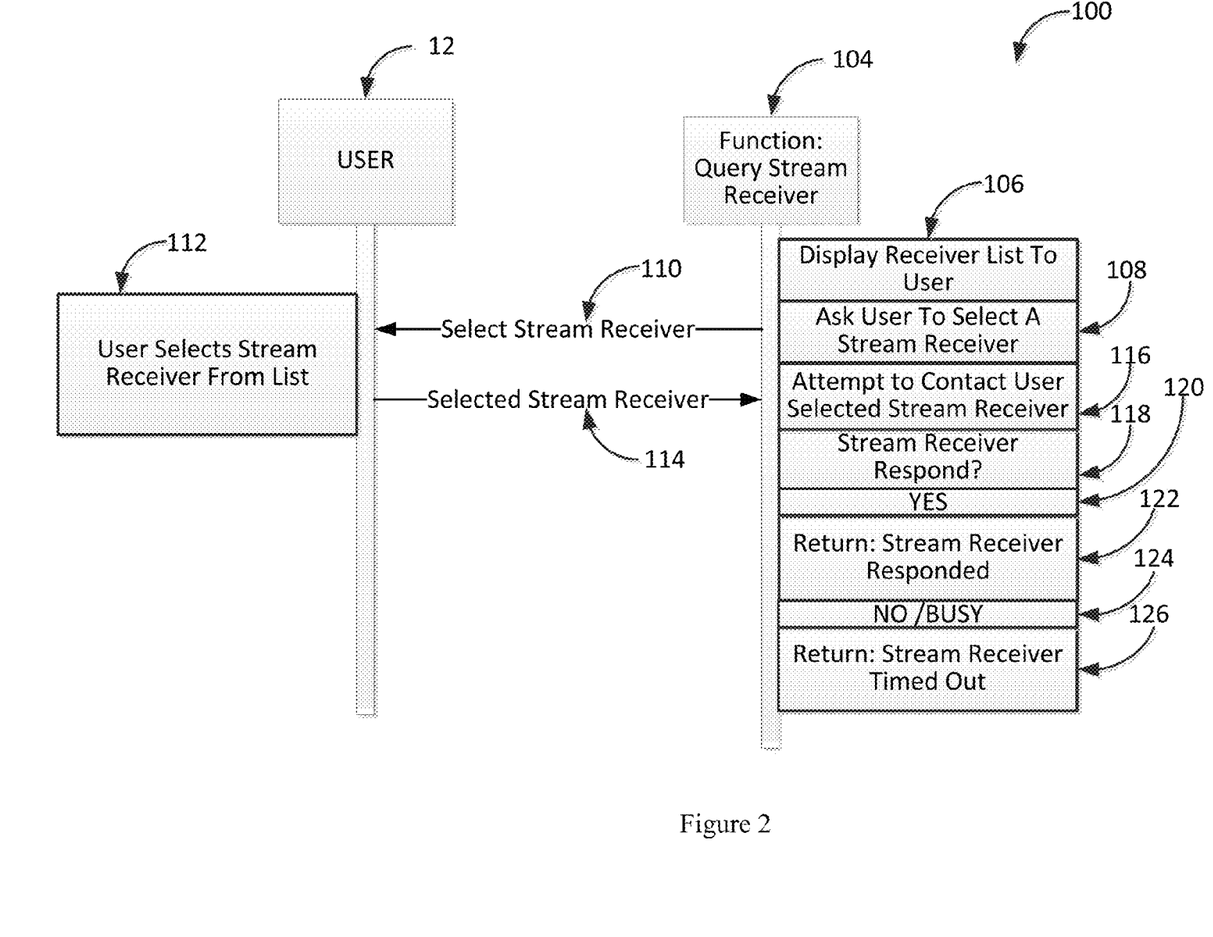
FIG. 2 is a depiction of a logic flow diagram for a callable function which queries a stream receiver to see if it is available.

User selection of one stream receiver by the user results in signal 114 "selected stream receiver" being sent to attempt processing block 116 "attempt to contact user selected stream receiver". This processing block uses the address of the user selected stream receiver to attempt contacting the selected stream receiver. If the stream receiver responds, decision processing block 118 "stream receiver respond?" within a predetermined period of time, control falls through to response processing block 120 "YES" after which control falls through to return processing block 122 "return: stream receiver responded".

If the stream receiver did not respond to decision processing block within a predetermined period of time or returned a "BUSY" status indicating that another stream is currently being received decision processing block 118 "stream receiver respond?" control will fall through to response processing block 124 "NO/BUSY" after which control will fall through to return processing block 126 "return: stream receiver timed out". This therefore returns a busy status to the requester if the previous user is already using the stream receiver, rather than simply preempting the current user for a new user.

In one embodiment, the stream or the password can be associated with a priority, so that a higher priority stream can in fact override the busy status, even if the previous user is already using the stream receiver. For example, one password, called herein a "CEO password" may have higher priority than other passwords, and may automatically terminate any previous session (other than a session that is of similar priority to the CEO password).

Either return processing block (122 or 126) of function 104 results in control transferring to FIG. 1 decision processing block 24 "stream receiver responded?". If the return from called function 104 was "NO" or "BUSY" at 26, control falls through to response processing block 26 "NO" after which control falls through to notification processing block 28 "notify user: session terminated".

If the return from called function 104 was "YES", control transfer to call function processing block 30 "call function: get password for stream receiver". This carries out the Function to Get Password For Stream Receiver shown in FIG. 3 where 150 depicts the callable function: "Get Password For Stream Receiver" 152. Execution of the function starts with processing block 154 "ask user to enter stream receiver password". This processing block displays a dialog to the user requesting to enter the password allowing access to the selected stream receiver. After the dialog is displayed, processing block 154 sends signal 156 "enter stream receiver password" to user 12 at processing block 158 where the "user enters stream receiver's password". While the specification uses the word "password" more generally the password is intended to be any kind of string that confirms that the user is intending to use one specific stream receiver. For example, this "password" may be printed on the outside of the stream receiver or in the room where the stream receiver is located. This is not simply a user ID login sequence, but rather a confirmation that the specific stream receiver is being selected. So not only must the user select the stream receiver, the user must also know some unique information, or password, before the user is allowed to use the stream receiver. After user 12 has entered the requested password, signal 160 "stream receiver password" is sent to processing block 162 "send password to stream receiver".

Figure 3:
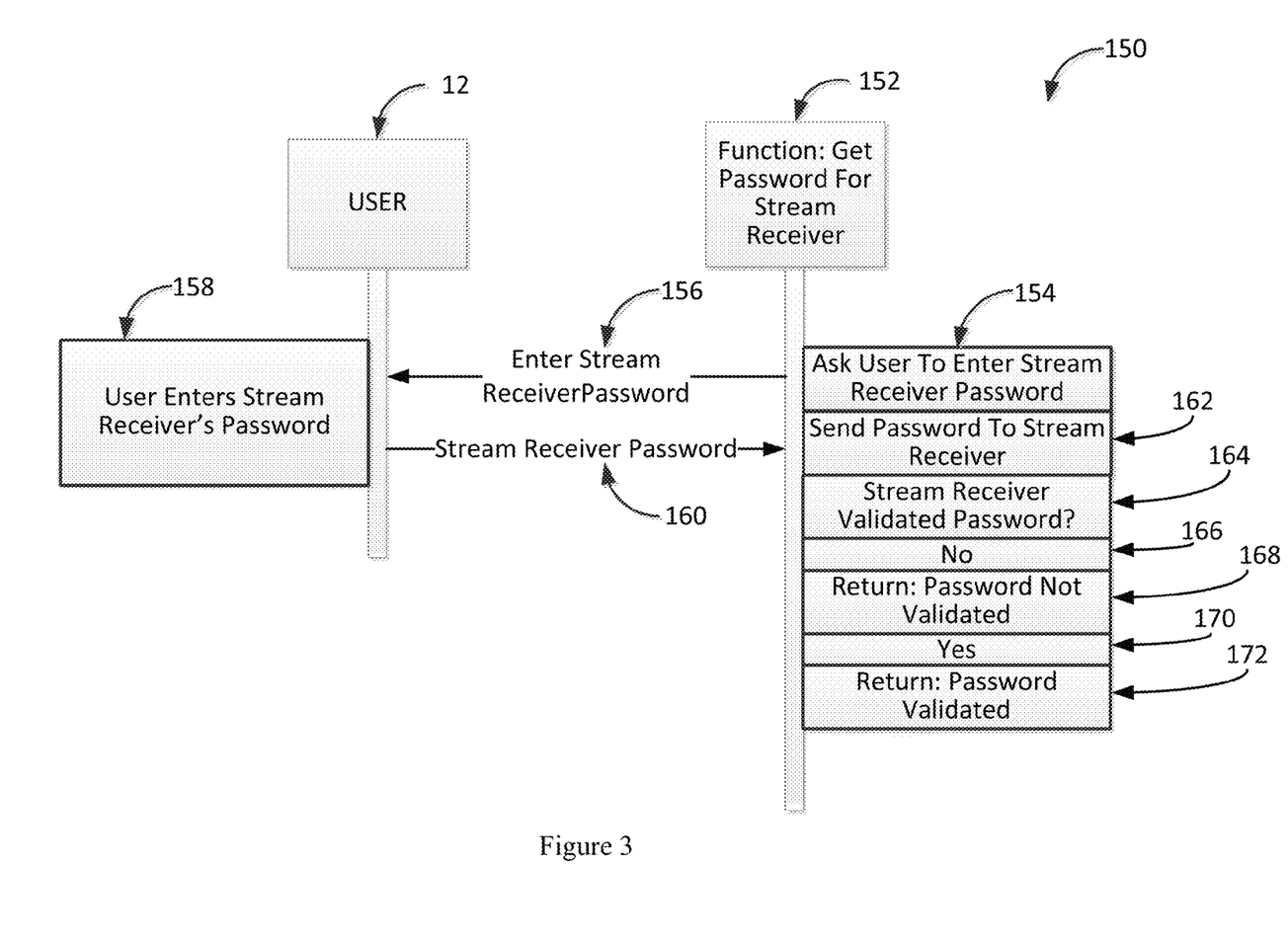
FIG. 3 is a depiction of a logic flow diagram for a callable function which solicits a password from the user that will allow access to the stream receiver.
Figure 6:
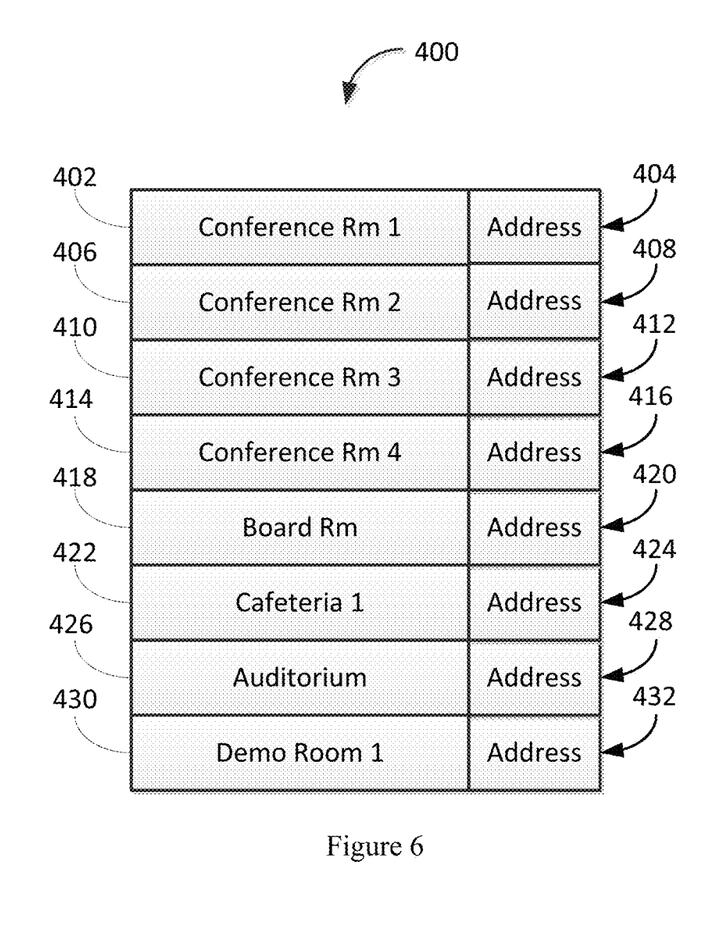
FIG. 6 is a depiction of a table containing the names and addresses of a plurality of stream receivers residing on the network.

This processing block will, using the selected stream receiver's name and address contained in list 400, send user entered password to the selected stream receiver after which control falls through to decision processing block 164 "stream receiver validated password?". This processing block waits for a predetermined period of time for the selected stream receiver to either validate or not validate the password. If the stream receiver does not validate the password control falls through to response processing block 166 "NO" after which control falls through to return processing block 168 "return: password not validated". Otherwise, control transfers to response processing block 170 "YES" after which control falls through to return processing block 172 "return: password validated".

Either return processing block (168 or 172) of function 152 will result in control transferring to FIG. 1 decision processing block 32 "stream receiver validate password?". If the return from called function 152 was "NO", control transfers to notify processing block 28 "notify user: session terminated". IF the return from called function 152 was "YES", control falls through to call function processing block 36 "call function: get stream source from user".

Figure 4:
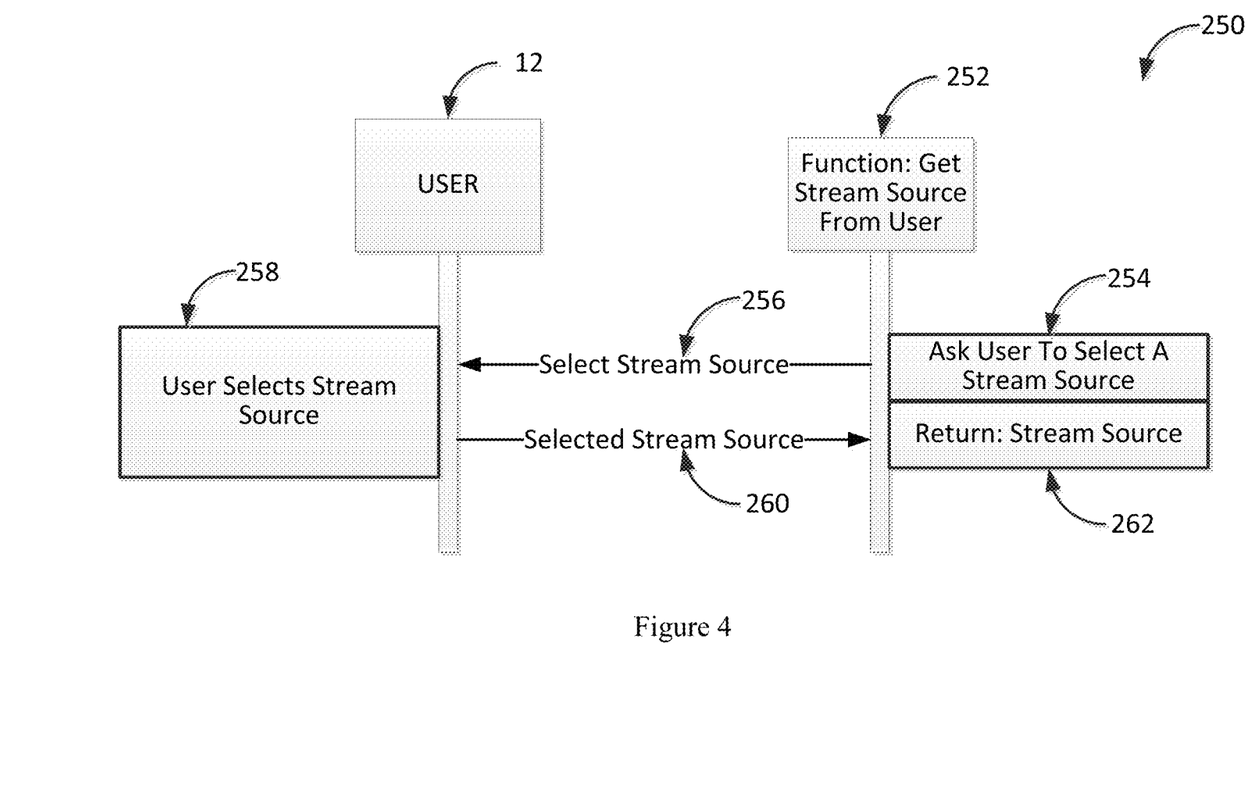
FIG. 4 is a depiction of a logic flow diagram for a callable function which prompts the user to enter the source URL for the stream the stream receiver will stream.

The Function: Get Stream Source from User is shown in FIG. 4 where 250 depicts "callable function: Get Stream Source from User" 252. Execution of the function starts with ask user processing block 254 "ask user to select a stream source". This processing block displays a dialog to the user requesting him to enter a URL for the location of the stream source. After the dialog is displayed, processing block 254 will send signal 256 "select stream source" to user 12 at processing block 258 "user selects stream source". After user 12 has entered the URL for the stream source, signal 260 "selected stream source" is sent to return processing block 262 "Return: stream source".

Figure 5:
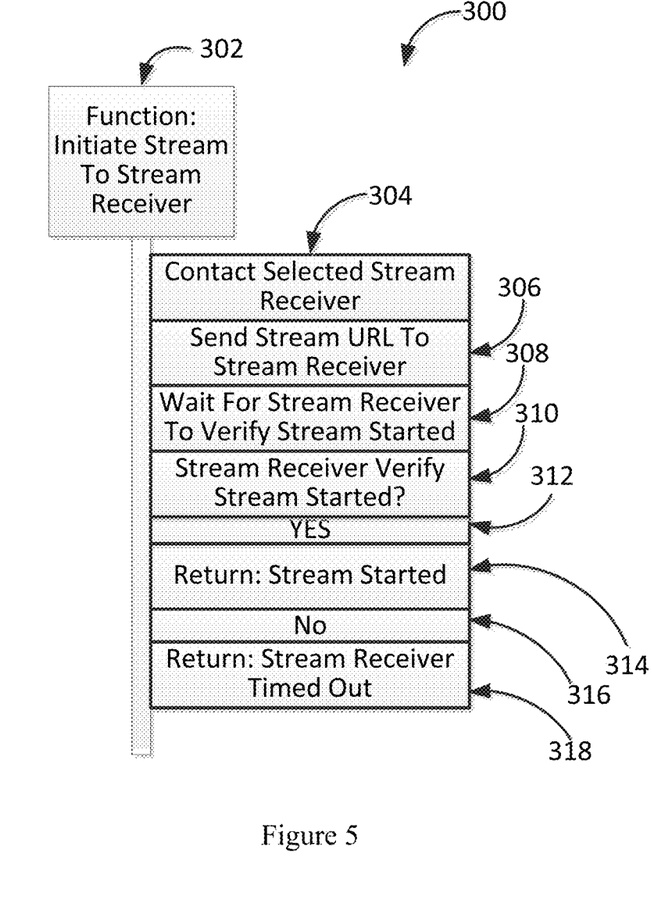
FIG. 5 is a depiction of a logic flow diagram for a callable function which initiates an identified stream to the stream receiver.

Control transfers to call function processing block 38 "call function: initiate stream to stream receiver". Function: Initiate Stream to Stream Receiver is shown in FIG. 5 where 300 depicts callable "function: initiate stream to stream receiver" 302. Execution of the function starts with contact processing block 304 "contact selected stream receiver". This processing block will reestablish the communications link between the stream caster and the stream receiver after which control will fall through to send processing block 306

"send stream URL to stream receiver". This processing block sends the user entered URL for the location of the stream source after which control will fall through to wait processing block 308 "wait for stream receiver to verify stream started". This processing block waits for the stream receiver to verify that the content stream has started streaming. After waiting for some predetermined period of time the stream receiver replies and control falls through to decision processing block 310 "stream receiver verify stream started?". If the stream has started, control falls through to result processing block 312 "YES" after which control will fall through to return processing block 314 "return Stream Started". If the stream has not started, control is transferred to result processing block 316 "NO" after which control falls through to return processing block 318 "return: stream receiver timed out".

Either return block (314 or 318) of function 302 results in control being transferred to decision processing block 40 "stream started?". If the stream has not started, control falls through to results processing block 42 "NO" after which control will be transferred to notify processing block 28 "notify user: session terminated". If the stream was started, control is transferred to notify processing block 44 "notify user: stream started".

Although only a few embodiments have been disclosed in detail above, other embodiments are possible and the inventors intend these to be encompassed within this specification. The specification describes certain technological solutions to solve the technical problems that are described expressly and inherently in this application. This disclosure describes embodiments, and the claims are intended to cover any modification or alternative or generalization of these embodiments which might be predictable to a person having ordinary skill in the art. For example, the techniques described herein can be used with other kinds of shapes and sounds, and with different kinds of external sensors.

Note also that the above has described operation with a digital television. However, more generally, this can be used on any kind of device that displays videos, such as television sets, Set top boxes, Game consoles, Tuner dongles, Personal computers, and any other device having the ability to display AV content. Also, while this describes only a few specific kinds of encryption keys and key exchanges, it should be understood that this can be used with other kinds of systems that perform a key exchange.

Other kinds of content receivers and content servers are also contemplated, it being understood that each of these can be carried out by a computer that has a processor that executes stored instructions of any known type.

Those of skill would further appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be controlled by a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard wired network cable such as Ethernet or may be a wireless connection such as a RF link running under a wireless protocol such as 802.11. Likewise, external bus 18 may be any of but not limited to hard wired external busses such as IEEE-1394 or USB. The computer system can also have a user interface port that communicates with a user interface, and which receives commands entered by a user, and a video output that produces its output via any kind of video output format, e.g., VGA, DVI, HDMI, displayport, or any other form. This may include laptop or desktop computers, and may also include portable computers, including cell phones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non transitory computer based instructions. An exemplary storage medium is coupled to the processor such that the processor can read information from, and write information to, the storage medium. In the alternative, the storage medium may be integral to the processor. The processor and the storage medium may reside in reconfigurable logic of any type.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

The memory storage can also be rotating magnetic hard disk drives, optical disk drives, or flash memory based storage drives or other such solid state, magnetic, or optical storage devices. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, or operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Also, the inventor(s) intend that only those claims which use the words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of using a stream receiver on a network, comprising:
    operating a first stream receiver on the network, by communicating over the network with stream senders, but not broadcasting a network name over the network as part of the communicating;
    receiving, in the first stream receiver, an indication from a first stream sender indicating a request to send a stream of digital information to the first stream receiver;
    in response to said request, and prior to sending information, said first stream receiver requesting unique information from the first stream sender, where the unique information includes information that has been entered by a user at the first stream sender,
    wherein there are multiple items of unique information, at least one of which includes a password entered by a user, said password associated with a first priority;
    checking the password to determine if the password is authorized information at the stream receiver and also checking to determine if a first priority associated with the password which has been entered by the user indicates a higher priority request than a second priority from a currently playing stream from a second stream sender;
    and said stream receiver responds with an indication that the stream receiver is busy when the stream receiver is receiving a stream that has been sent by a user having a password with a same or higher priority as said first priority,
    and said stream receiver responds to said receiving by terminating said stream from said different stream sender and playing the stream of digital information if the password having the first priority is a higher priority than the second priority, and receiving the stream of digital information from the first stream sender, and displaying the stream of digital information from the first stream sender using the first stream receiver.

2. The method as in claim 1, wherein the stream receiver runs a protocol for storing an assigned password for the stream receiver as said unique information and runs a protocol for requesting the password for the stream receiver to be entered and received from the stream sender.

3. The method as in claim 1, wherein said stream receiver receives information via a wireless network protocol.

4. The method as in claim 1, wherein said stream receiver has an address that is used to contact said stream receiver from said stream sender and from other stream senders and where said address is not broadcast over the network.

5. The method as in claim 1, wherein the unique information is also printed on an outside of the stream receiver.

6. A system that controls a stream receiver to communicate to one or more stream senders, comprising:
    a processing element that sends a list of multiple stream receivers on a network, where the list of stream receivers do not broadcast network names over the network;

said processing element receiving an indication from a stream sender indicating a request to send a stream of digital information to a first stream receiver from said list;

said processing element communicating with said multiple stream senders over a network, and receiving a stream of digital information from said first stream sender;

the processing element receiving a password entered by a user from the first stream sender, said password associated with a first priority;

the processing element checking the password to determine if the password is authorized for the stream receiver and also checking to determine if a first priority associated with the password which has been entered by the user indicates a higher priority request than a second priority from a currently playing stream from a second stream sender;

and said stream receiver responds with an indication that the stream receiver is busy when the stream receiver is receiving a stream that has been sent by a user having a password with a same or higher priority as said first priority, and said stream receiver responds to said receiving by terminating said stream from said different stream sender and playing the stream of digital information if the password having the first priority is a higher priority than the second priority, and receiving the stream of digital information from the stream sender to cause an output indicative thereof to be displayed on the stream receiver.

7. The system as in claim 6, wherein said stream receiver receives information via wireless network protocol.

8. The system as in claim 6, wherein the unique information is also printed on an outside of the stream receiver.

* * * * *